US012643488B2

(12) United States Patent
Masanek, Jr.

(10) Patent No.: US 12,643,488 B2
(45) Date of Patent: Jun. 2, 2026

(54) VEHICLE CARGO AREA LINER WITH AFFIXATION DEVICE

(71) Applicant: MACNEIL IP LLC, Bolingbrook, IL (US)

(72) Inventor: Frederick W. Masanek, Jr., Barrington, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 537 days.

(21) Appl. No.: 18/364,912

(22) Filed: Aug. 3, 2023

(65) Prior Publication Data

US 2025/0042345 A1      Feb. 6, 2025

(51) Int. Cl.
B60R 13/01           (2006.01)

(52) U.S. Cl.
CPC ................................... B60R 13/01 (2013.01)

(58) Field of Classification Search
CPC . B60R 13/01; B60R 13/011; B60R 2013/018; B60N 3/04; B60N 3/044; B60N 3/046; B60N 3/048; F16B 5/0004; F16B 5/02; F16B 5/0208; F16B 5/0258; F16B 5/06
USPC ................................................ 296/39.1, 39.2
See application file for complete search history.

(56) References Cited

U.S. PATENT DOCUMENTS

| | | | |
|---|---|---|---|
| 1,896,873 A | 2/1933 | Upham | |
| 2,456,480 A * | 12/1948 | Austin | .................. F16B 7/0446 |
| | | | 403/228 |
| 3,248,995 A * | 5/1966 | Meyer | ...................... F16B 5/128 |
| | | | 24/297 |
| 4,592,583 A * | 6/1986 | Dresen | .................... B60R 13/01 |
| | | | 296/39.2 |
| 4,599,768 A * | 7/1986 | Doyle | ..................... F16B 21/02 |
| | | | 24/456 |
| 4,740,026 A * | 4/1988 | Wagner | ................... B60R 13/01 |
| | | | 403/348 |
| 4,829,627 A | 5/1989 | Altus et al. | |
| 4,850,633 A * | 7/1989 | Emery | .................... B60R 13/01 |
| | | | 411/908 |
| 5,364,150 A * | 11/1994 | Cochran | ................. B60R 13/01 |
| | | | 24/297 |
| 6,497,003 B2 | 12/2002 | Calabrese | |
| 7,945,992 B2 | 5/2011 | Parisi et al. | |
| 9,199,567 B1 | 12/2015 | Kaufman et al. | |
| 9,517,712 B1 | 12/2016 | Masanek et al. | |
| 9,610,880 B2 | 4/2017 | Masanek et al. | |
| 10,011,207 B2 | 7/2018 | Macneil et al. | |

(Continued)

FOREIGN PATENT DOCUMENTS

| | | | | |
|---|---|---|---|---|
| DE | 3232926 C2 | * | 12/1985 | |
| DE | 29908823 U1 | * | 9/1999 | ............. B60N 3/046 |

(Continued)

*Primary Examiner* — Hilary L Gutman

(74) *Attorney, Agent, or Firm* — Perkins IP Law Group LLC; Jefferson Perkins

(57)           ABSTRACT

A vehicle cargo area liner, such as a pickup truck bed liner, is affixed to a vehicle wall using a pin-and-socket affixation device. The rounded free end of the pin permits an upstanding panel of the liner to have a substantial draft with respect to the vehicle wall. Use of one, two or more of the affixation devices prevents separation of the liner from the pickup truck bed in windy conditions.

22 Claims, 10 Drawing Sheets

(56)　　　　　References Cited

U.S. PATENT DOCUMENTS

| | | | | |
|---|---|---|---|---|
| 2002/0008398 | A1 * | 1/2002 | Long | B60R 13/01 |
| | | | | 296/39.2 |
| 2008/0258488 | A1 * | 10/2008 | Philip | B60R 13/011 |
| | | | | 296/39.1 |
| 2010/0122429 | A1 | 5/2010 | Gonzalez et al. | |
| 2012/0284975 | A1 * | 11/2012 | Clarke | B60R 13/0206 |
| | | | | 24/595.1 |
| 2017/0028895 | A1 * | 2/2017 | Masanek, Jr. | B60N 3/046 |
| 2017/0036582 | A1 * | 2/2017 | Macneil | B32B 25/042 |
| 2017/0057391 | A1 * | 3/2017 | Masanek, Jr. | B60N 3/044 |
| 2017/0343023 | A1 * | 11/2017 | Schevers | F16B 5/025 |
| 2018/0252252 | A1 * | 9/2018 | Fritzsch | F16B 21/078 |
| 2018/0257583 | A1 * | 9/2018 | Martinez | B60R 13/011 |

FOREIGN PATENT DOCUMENTS

| | | | | | |
|---|---|---|---|---|---|
| DE | 000019617408 | C2 | 2/2003 | | |
| DE | 102012206934 | A1 * | 10/2013 | | F16B 21/075 |
| DE | 202014103406 | U1 * | 8/2014 | | B60N 3/046 |
| DE | 202015005870 | U1 * | 11/2016 | | F16B 21/078 |
| DE | 202016102805 | U1 * | 12/2016 | | B60N 3/04 |
| DE | 102019131901 | A1 * | 5/2020 | | F16B 41/002 |
| EP | 1980444 | A2 | 10/2008 | | |
| EP | 3072737 | A1 * | 9/2016 | | F16B 21/075 |
| FR | 1405310 | A | 5/1965 | | |
| FR | 2801852 | A1 * | 6/2001 | | B60N 3/046 |
| GB | 936095 | A | 9/1963 | | |
| GB | 1073408 | A | 6/1967 | | |

* cited by examiner

VEHICLE CARGO AREA LINER WITH AFFIXATION DEVICE

BACKGROUND OF THE INVENTION

It is known to provide removable liners for the cargo areas of vehicles, including ones for pickup truck beds. Such liners are now often molded as a one-piece constructions, typically of a thermoplastic polymer. Most such liners are continuous sheets so as to form barriers to the attack of the pickup truck bed from possibly corrosive fluids, abrasive particulates and heavy rigid objects.

The open beds of pickup trucks are often exposed to windy conditions when the trucks are driven at highway speeds. This has caused a concern that a single-piece pickup truck bed liner, with a large surface area, could suddenly delaminate from and fly out of the truck bed, with possibly harmful or fatal consequences to other traffic.

Vehicle cargo area liners often have a floor panel and one or more walls joined to the periphery of the floor panel. These walls improve the protection afforded by the liner, but, when they are outside of the enclosed interior of the vehicle, present upstanding surfaces against which air currents could impact, increasing the danger of the entire liner separating from the cargo area. For moldability and fit reasons, the walls are sometimes molded with a draft in relation to the vehicle walls that they are designed to protect. This has posed an issue in providing one or more fasteners between the vehicle wall and the upstanding liner wall. But ideally any such fasteners should be of relatively simple construction and should be installable by the end consumer without tools.

SUMMARY OF THE INVENTION

The present invention provides a vehicle cargo area liner, and more particularly a pickup truck bed liner, with one or more fasteners for fastening an upstanding wall of the liner to an adjacent vehicle wall. Means are provided for attaching an attachment plate to the vehicle wall. A pin extends rearwardly from this attachment plate on a first axis and terminates in an enlarged and rounded free end. The free end has a first diameter orthogonal to the first axis. A socket or cap having a circumferential sidewall extends toward the vehicle wall on a second axis that is at an angle to the first axis. An exterior surface of the socket sidewall is received in a corresponding hole made in an upstanding panel of a liner for the vehicle cargo area. The upstanding panel upwardly extends from a peripheral edge of a floor panel of the liner. The sidewall of the socket is made of a resilient material and has a forward end. A second diameter across the forward end of the socket sidewall at rest, taken in a direction orthogonal to the second axis, is less than the first diameter of the free end of the pin. This means that when the upstanding panel and the socket are advanced toward the pin, the forward end of socket sidewall will resiliently deform around and capture the enlarged head of the pin, thus joining the pin to the socket and fastening the upstanding panel of the liner to the vehicle wall.

In one embodiment, the sidewall of the socket is divided into a plurality of fingers by a plurality of slots extending rearwardly from the forward end of the socket sidewall. The slots are angularly spaced apart from each other around the second axis and may be concavely curved relative to the second axis. In one embodiment, each finger may be reinforced with a radially oriented gusset rib that extends from the exterior surface of the sidewall to a forward surface of the base.

In one embodiment, the means for attaching the attachment plate to the vehicle wall is an adhesive layer. In one embodiment, the free end of the pin is spherical in shape or is a ball.

In one embodiment the hole in the upstanding panel has a third diameter. The upstanding panel has a rear surface which faces the cargo area. A base of the socket abuts this rear surface and has an outer periphery with a fourth diameter that is larger than the third diameter. A rearward end of the socket sidewall is joined to the base radially inwardly from the outer periphery. In one embodiment, the base completely covers the hole.

In one embodiment, a center of the base is disposed rearwardly of the outer periphery of the base, thereby extending the socket interior rearwardly of the rear surface of the upstanding panel. This accommodates a portion of the enlarged head of the pin when the enlarged head of the pin is inserted beyond the forward end of the socket sidewall.

In one embodiment, first and second holes are made in the upstanding panel so as to be spaced apart from each other. There are provided a first attachment plate, a first pin and a first socket, and a second attachment plate, second pin and second socket. The second attachment plate is affixed to the vehicle wall at a location spaced from the first attachment plate. The second pin extends rearwardly from the second attachment plate along a third axis, away from the vehicle wall. The second pin has a second shaft and a rounded second free end that is enlarged relative to the second shaft. The second free end has a third diameter orthogonal to the third axis. The second socket has a forwardly extending circumferential second sidewall that is formed of an elastic material. The second sidewall is disposed on a fourth axis, bounds a second socket interior and has a second forward end. A fourth diameter, taken across the second forward end in a direction orthogonal to the fourth axis when the second sidewall is at rest, is less than the third diameter.

In one embodiment, a draft of the upstanding panel relative to the vehicle wall is in the range of about 0 degrees to about 15 degrees. An angle between the first axis and the second axis may be in the range of about 0 degrees to about 15 degrees. Preferably, the draft between the vehicle wall and the upstanding panel is in the range of about 5 degrees to about 10 degrees. In one particular embodiment, the draft between the vehicle wall and the upstanding panel is about 7 degrees. In another embodiment, the draft between the vehicle wall and the upstanding panel is about 10 degrees.

In one embodiment, the attachment plate and pin are integrally molded of a polymer. In other embodiments, the pin and the attachment plate may be metal and affixed to the vehicle sidewall with means such as welding. The socket may be integrally molded of a tough and resilient polymer compound such as a blend of polybutylene terephthalate (PBT) and polycarbonate (PC). In one embodiment, the same polymer compound may be used to mold the attachment plate+pin and the socket.

In another aspect of the invention, a liner for a vehicle cargo area comprises a floor panel that has a peripheral edge. In use, the floor panel is disposed on a floor of a vehicle cargo area. An upstanding panel of the liner upwardly extends from the peripheral edge, and in use is disposed adjacent a vehicle wall bounding the floor of the vehicle cargo area. A first surface of the upstanding panel faces the vehicle wall. A second, opposed surface of the upstanding panel faces the vehicle cargo area. At least one hole is formed through the upstanding panel from the first surface to the second surface. An attachment plate has a means for attaching to the vehicle wall. A pin extends from the attachment plate in a first direction along a first axis. The pin has a shaft and a rounded free end that is enlarged relative to the shaft. The free end has a diameter orthogonal to the first axis. The socket is formed on a second axis. A circumferential sidewall of the socket extends in a second direction along the second axis toward the vehicle wall. An exterior surface of the sidewall is received in the hole in the upstanding panel. The sidewall is formed of a resilient material and has a first end. A diameter of the sidewall across its first end, when at rest, is less than the diameter of the free end of the pin. The free end of the pin may be inserted into the socket interior in the first direction beyond the first end of the sidewall to fasten the upstanding panel to the vehicle wall. The first axis is capable of being disposed at an angle to the second axis.

In one embodiment, the means for affixing the attachment plate to the vehicle wall comprises an adhesive layer. In one embodiment, the vehicle cargo area is a pickup truck bed. In one embodiment, the free end of the pin is fastened to the socket in an interference fit. The vehicle wall may be a rear wall of a pickup truck cab, another wall of the pickup truck bed such as a side wall, or a wall in the interior of the vehicle.

In another aspect of the invention, a liner for a vehicle cargo area has a floor panel and an upstanding panel that extends upwardly from a peripheral edge of the floor panel. At least one hole is formed in the upstanding panel. An attachment plate has a front surface and a rear surface. Means, such as an adhesive layer, attach the front surface to a vehicle wall bounding the vehicle cargo area. A nut housing is formed in the attachment plate. A convexly curved rear surface of the nut housing extends rearwardly from the rear surface of the attachment plate. A concavely curved front surface of the nut housing extends rearwardly from the front surface of the attachment plate. A slot is formed in the nut housing to extend from its front surface to its rear surface, and has a predetermined slot width between its opposed parallel sides. A nut is received in the nut housing. Opposed sides of the nut have a width between them that is larger than the slot width. A rear surface of the nut is convexly curved and is adapted to slide along the concavely curved rear surface of the nut housing. A cap has a front surface and a rear surface. An endless sidewall of the cap forwardly extends from the cap front surface to be received in the panel hole. A forward concave annular end surface of the sidewall slidably engages with the convex rear surface of the nut housing. The cap has a central bore disposed radially interiorly of the sidewall and which extends from the cap front surface to the cap rear surface. A screw is inserted through this central bore, through the slot in the nut housing, and into a threaded bore of the nut. The screw, cap and nut are on a first axis. The attachment plate is disposed on a second axis. The first and second axes can assume any of a plurality of angles with respect to each other.

The invention permits the upstanding panel to be fastened to assume any of various angles to the vehicle wall. The upstanding walls of cargo area liners therefore do not have to match the angle of the vehicle walls to which they are affixed, and can instead have a pronounced draft that makes their manufacture easier.

BRIEF DESCRIPTION OF THE DRAWINGS

Further aspects of the invention and their advantages can be discerned in the following detailed description as read in conjunction with the drawings of exemplary embodiments, in which like characters denote like parts and in which.

DETAILED DESCRIPTION

Figure 1:
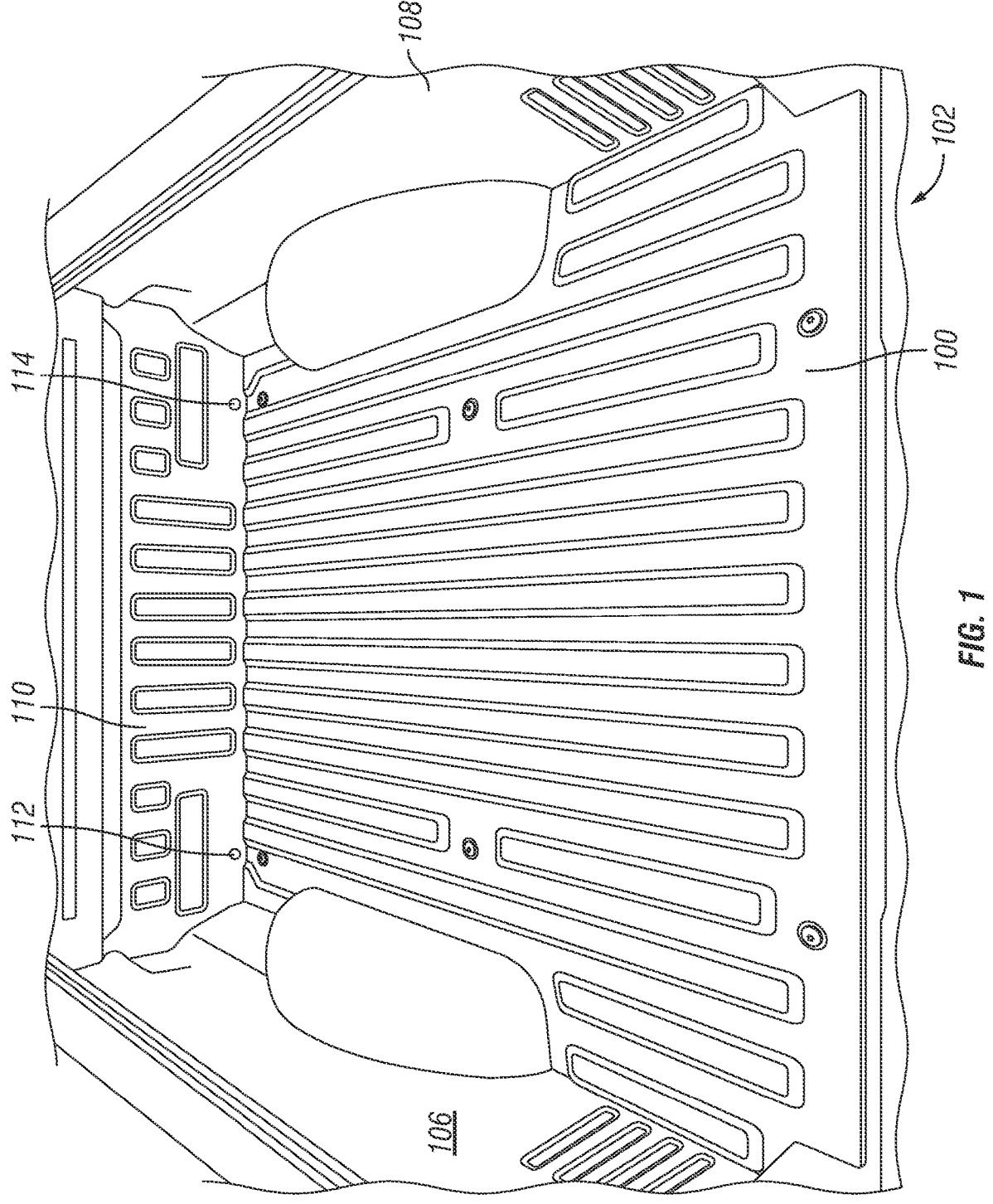
FIG. 1 is a top rear perspective view of a pickup truck bed, showing the locations on the rear cab wall of a pair of attachment plates.

A bed 100 of a pickup truck 102 is seen in FIG. 1. The bed 100 is one type of vehicle cargo area; other types of cargo areas include cargo areas behind the second row of seats in SUVs, minivans and the like. The illustrated pickup truck 102 happens to be a 2021 Ford F150, although of course the present invention has application to other pickup trucks and more generally to other vehicles with cargo areas, both exterior and interior. The bed 100 has a floor 104 bounded on the left by a left sidewall 106, on the right by a right sidewall 108, and on the front by a wall 110, which may also act as the rear wall of a pickup truck cab. Floor 104 and walls 106-110 are often finished in painted metal. Therefore polymer liners have been provided to protect their surfaces from corrosive fluids, abrasive particulates and dents from heavy objects.

A left attachment plate 112 has been affixed to wall 110 at a location near left wall 106 and above floor 104. In one embodiment, a center of the attachment plate 112 is about 5 inches from wall 106. Similarly, a right attachment plate 114 has been affixed to wall 110 at a location near right wall 108 and above floor 104, and so as to be widely spaced from attachment plate 112. In the illustrated embodiment, the attachment plates 112, 114 are circular in shape but could take any other convenient form. Respective pins, described below, rearwardly extend from the centers of plates 112, 114.

FIG. 1 shows bed 100 in the condition it would be in after a bed liner according to the invention had been removed. Attachment plates 112, 114 are portions of respective affixation devices which fasten the bed liner to the pickup truck bed, preventing its delamination from the bed by wind currents or the like. In the illustrated embodiment, two such affixation devices have been provided, both on vehicle wall 110. In other embodiments, only one such affixation device could be provided. In yet other embodiments, the affixation devices could, in addition or instead, attach the liner to the left wall 106, the right wall 108, or other vehicle walls. Such vehicle walls could, for example, be walls bounding a cargo space in the interior of the vehicle.

Figure 2:
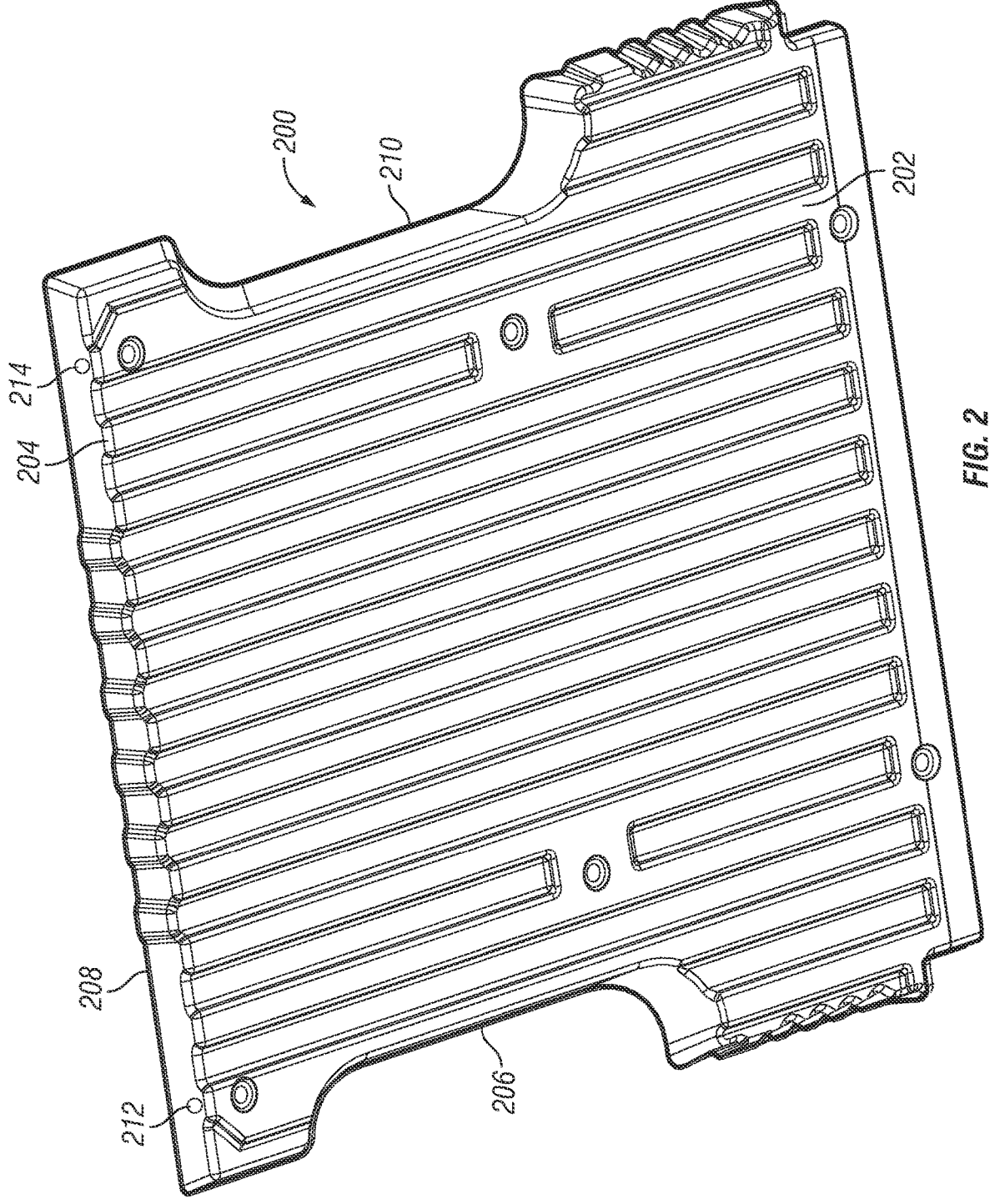
FIG. 2 is a liner adapted to be installed in the pickup truck bed of FIG. 1, showing holes in an upstanding front panel of the liner.

In FIG. 2 there is seen a truck bed liner 200 that is custom-designed to fit into pickup truck bed 102. Liner 200 has an extensive floor panel 202 with a peripheral edge 204. A left upstanding panel 206, a front upstanding panel 208, and a right upstanding panel 210 upwardly extend from the peripheral edge 204. The liner 200 may be injection-molded as one piece from a thermoplastic compound such as a thermoplastic elastomer (TPE), or may be thermoformed from a thermoplastic polymer sheet. Upstanding panels 206, 208, 210 protect lower portions of bed sidewalls 106, 110 and 108, but, because of the affixation device(s) according to the invention, their drafts do not have to conform to the drafts of the vehicle walls 106, 110 and 108. Usually the liner 200 presents an impervious barrier to possibly corrosive fluids or abrasive particles from contacting the bed floor 104 or the lower sections of the bed sidewalls 106-110. Because of its large surface area through which there are no perforations, the liner 200 may be susceptible to sudden delamination and separation from the pickup truck bed because of windy conditions. This danger could be incrementally increased if the wind gets between one of the upstanding panels 206-210 and the bed 100.

FIG. 2 shows liner 200 in a condition that it might take when received as a rolled-up tube, and then rolled out by a consumer to a flat form. A left hole 212 is formed in front panel 208 not far from left panel 206. A right hole 214 is formed in front panel not far from right panel 210 and to be widely spaced from hole 212. The placement of holes 212, 214 will match the placement of attachment plates 112, 114 once installation has been completed. Holes 212, 214 may be about five inches from respective side panels 206, 210, and should be located in regions of front panel 208 that afford good manual access to the installer. The holes 212, 214 may be circular and may be about one inch in diameter. In one embodiment, the holes 212, 214 are cut out by the consumer using endless deep circular grooves molded into the sheet which mark their boundaries. In another embodiment, as provided to the consumer all of the holes 212, 214 are flashed over with plastic, with the consumer removing the flash as part of the installation procedure.

Figure 3A:
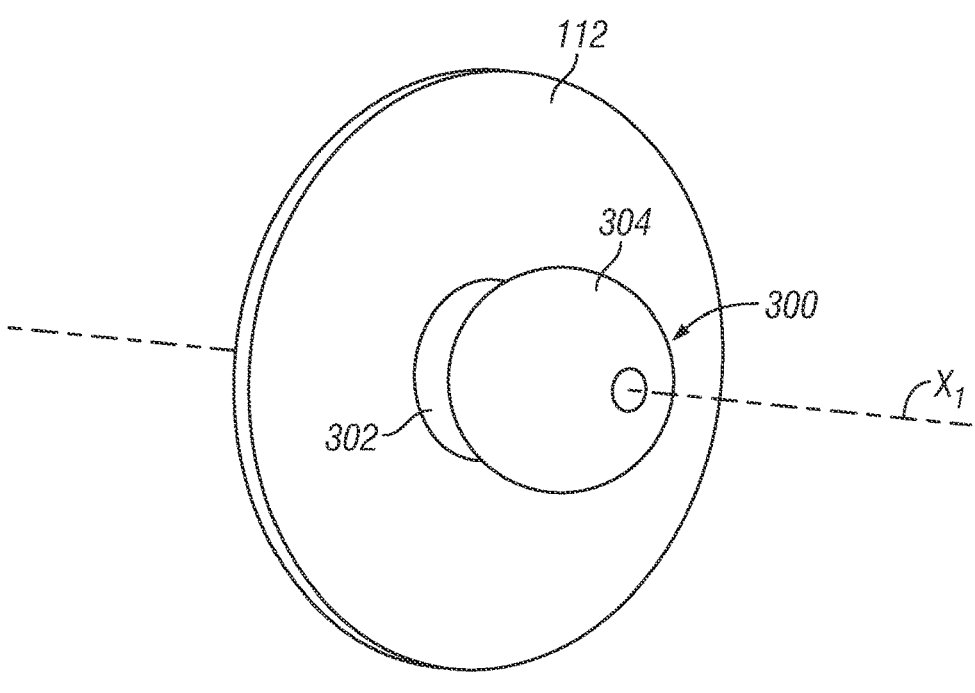
FIG. 3A is a perspective rear view of an attachment plate and pin.
Figure 3B:
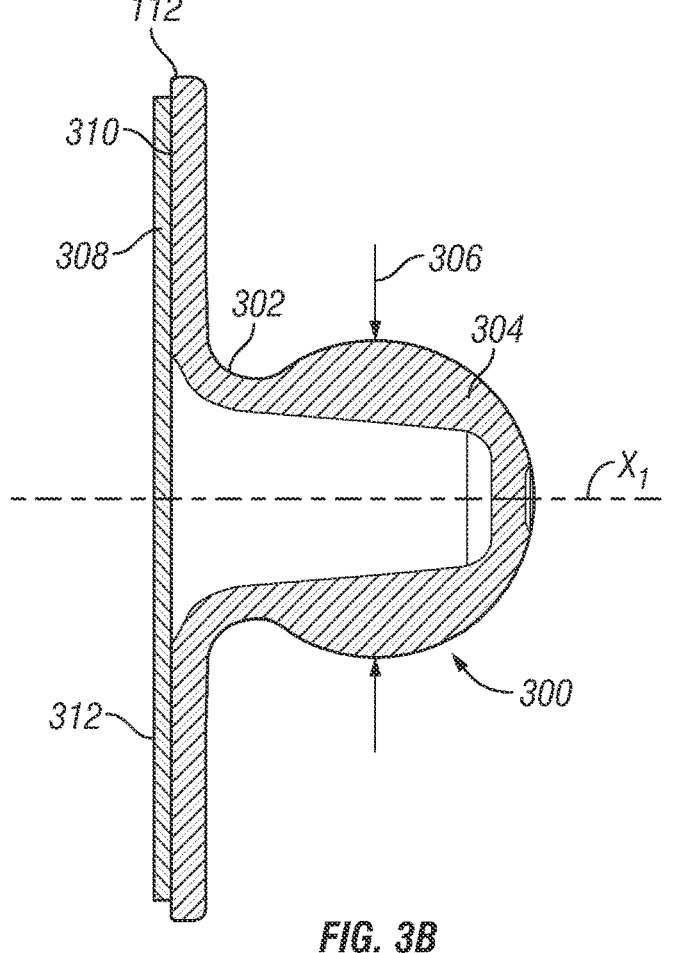
FIG. 3B is an axial sectional view of the attachment plate and pin of FIG. 3A.

One form of an attachment plate 112 and pin 300 is shown in FIGS. 3A and 3B. Attachment plate 114 can be similar in form to attachment plate 112 and so only attachment plate 112 is described here. The pin 300 extends outwardly (as used on vehicle panel 110, rearwardly, meaning toward the rear of the vehicle) along an axis $X_1$. Pin 300 has a shaft 302 and a free end 304 that is enlarged relative to the shaft 304. Free end 304 should be rounded and, in the illustrated embodiment, is a spherical ball. Free end 304 could take other shapes, such as other spheroids, or could be shaped as a cylinder along an axis that is horizontal and orthogonal to axis $X_1$. Free end 304 has a maximum diameter 306 that is taken in a direction orthogonal to axis $X_1$. Pin 300 and attachment plate 112 conveniently may be molded as a single piece from a polymer compound of a certain rigidity, such as a blend of polybutylene terephthalate (PBT) and polycarbonate (PC). In other embodiments, at least pin 300, or all of attachment plate 112 and pin 300, could be formed of a rigid metal. Pin 300 may have a hollow interior as shown.

An adhesive layer 308 may be attached to a front surface 310 of the attachment plate 112. A front-facing surface 312 of the adhesive layer 308 may be protected by a release layer (not shown) that may be peeled off by the end user prior to mounting the adhesive layer 308 to the vehicle wall 110. In one embodiment adhesive layer 308 is initially in the form of a double-sided mounting tape, with front and rear release layers; the rear release layer (not shown) may be removed and layer 308 adhered to surface 310 prior to shipment of the attachment plate 112 to the end user. In other embodiments, the pin 300 could be attached via plate 112 as by welding, or even directly to the wall 110 without a dedicated attachment plate being provided; in this last instance, the entire vehicle wall 110 serves as an equivalent to the attachment plate.

Figure 4A:
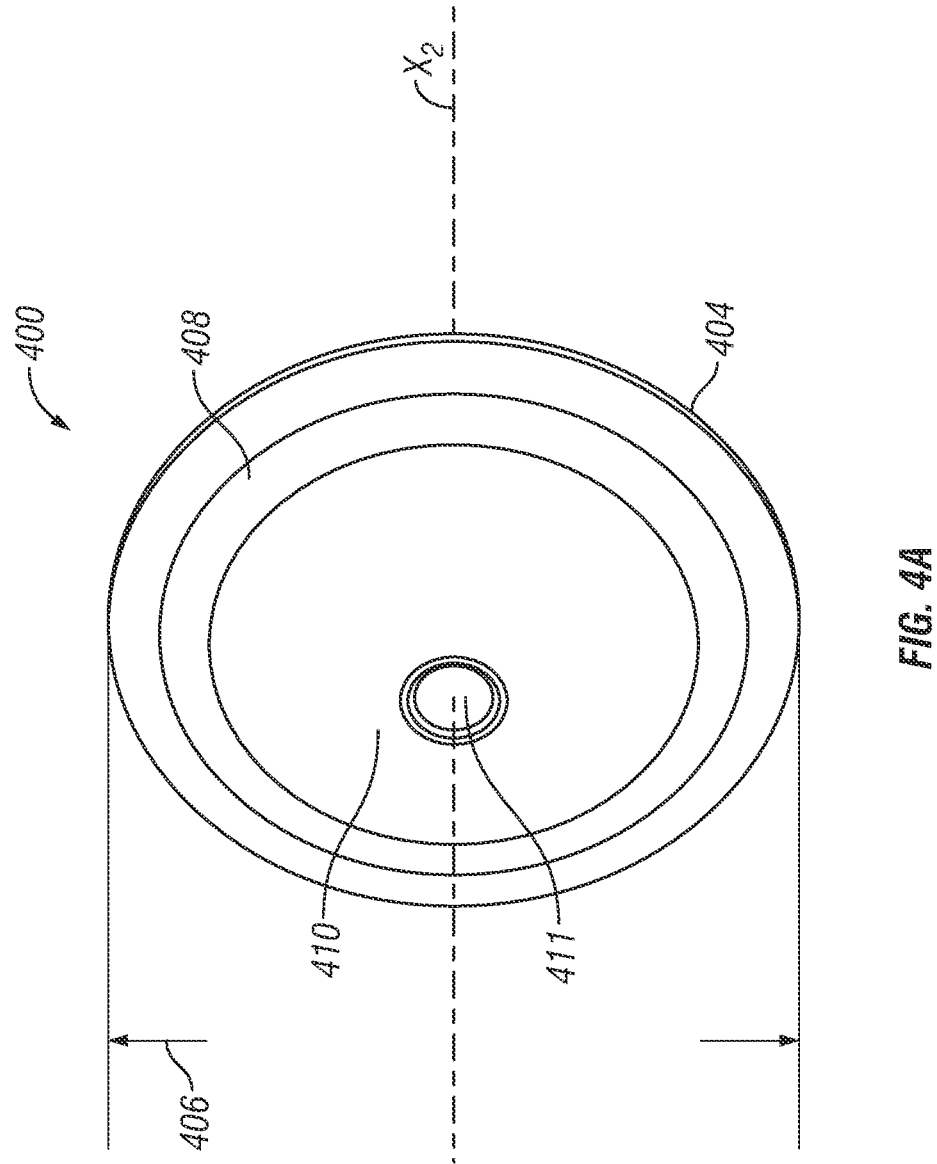
FIG. 4A is a rear perspective view of a socket for fastening to the attachment plate and pin of FIGS. 3A and 3B.
Figure 4B:
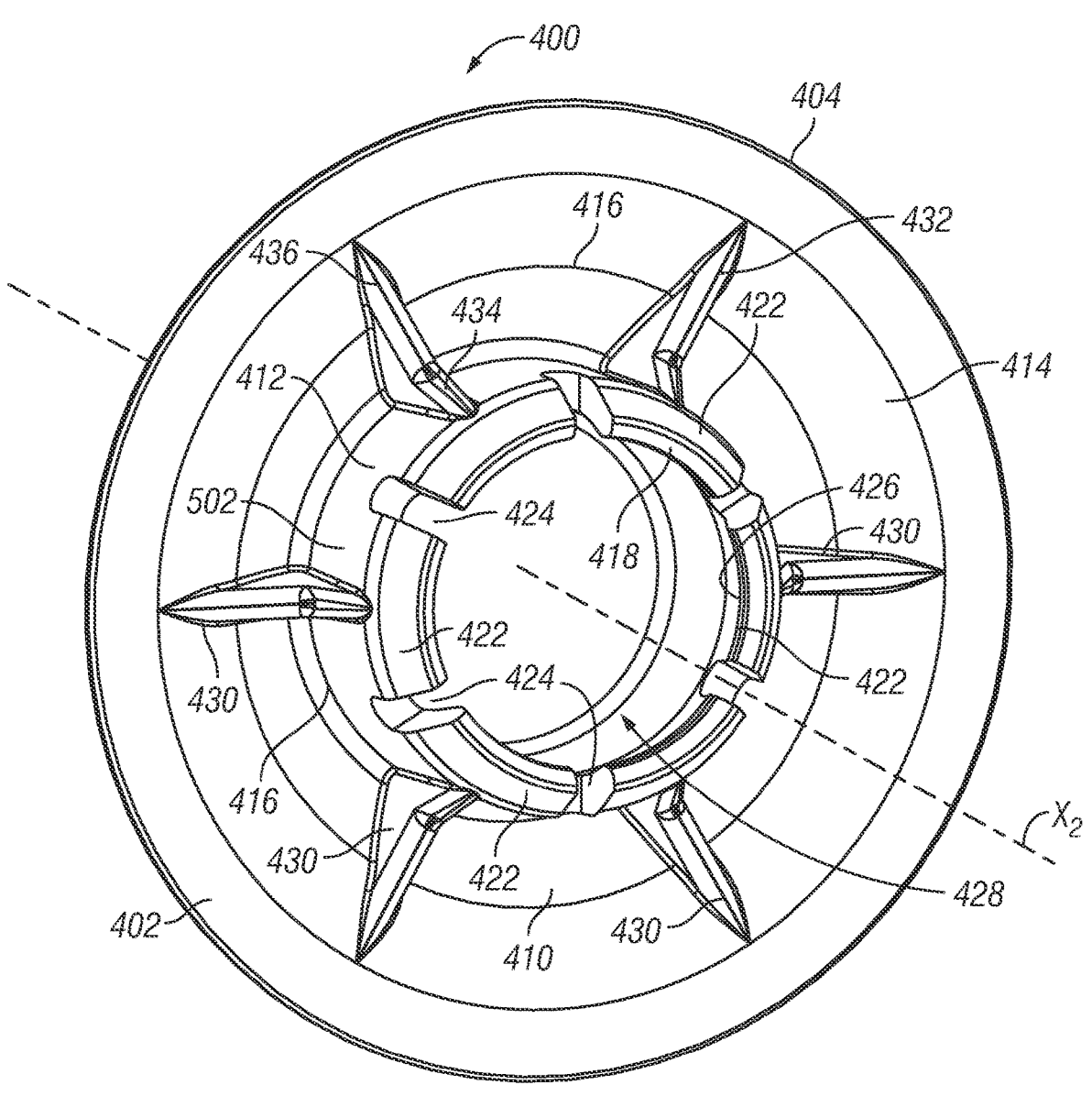
FIG. 4B is front perspective view of the socket shown in FIG. 4A.
Figure 4C:
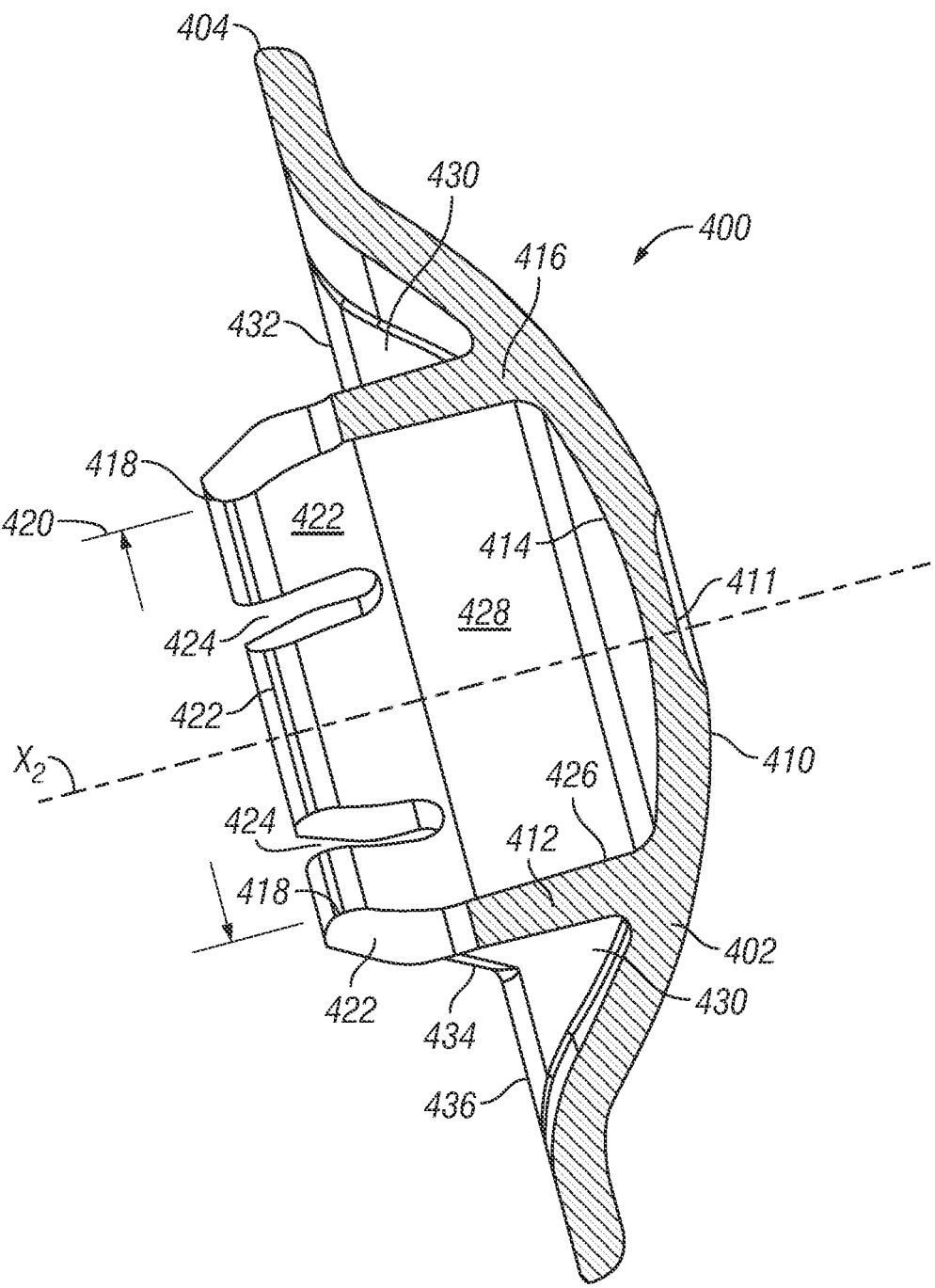
FIG. 4C is an axial sectional view of the socket shown in FIGS. 4A and 4B.

Referring to FIGS. 4A-4C, a socket or cap 400 is provided to fasten to the enlarged free end 304 of the pin 300. In use, the socket 400 is disposed on an axis $X_2$. In the illustrated embodiment, socket 400 is radially symmetrical about axis $X_2$. Socket 400 has a base 402 that may have a circular periphery 404. The periphery 404 has a diameter 406, which may be about 2 inches. In the illustrated embodiment the base 402 presents a continuous surface 408 on its rearward side such that, when mounted to a hole 212 or 214, surface 408 will cover hole 212 or 214 and thus present a barrier to liquids and particulates. Base 400 includes a central domed portion 410 which, as explained below, accommodates a portion of the pin end or ball 304 when the socket 400 is fastened to pin 300. The most rearward portion of domed portion 410 is at or near its center 411, which is significantly rearward of periphery 404.

The front side of the socket 400 is shown in FIG. 4B. A somewhat cylindrical sidewall 412 extends forwardly from a front surface 414 of base 402. A rear end 416 (FIG. 4C) of sidewall 412 is joined to surface 414 at a position that is radially inward from periphery 404. The sidewall terminates in a front, free end 418. A diameter 420, taken in a direction orthogonal to axis $X_2$ at the inner surface of free end 418, is less than ball diameter 306.

At least the sidewall portion 412 of socket 400 is formed of a tough, resilient material, such as a PBT+PC polymer blend. The polymer compound used to mold pin 300 and attachment plate 114 may be the same as that used for socket 400. In the illustrated embodiment base 402 and sidewall 412 are molded as a single piece from a polymer. The polymer compound used may have a flexural modulus of about 2100 MPa as measured according to ISO 178. The overall ability of sidewall 412 to flex may be enhanced by dividing it into a plurality of fingers 422 by axially aligned slots 424. The fingers 422 may be concavely curved relative to axis $X_2$, such that the free end 418 of the sidewall 412 is necked down, or closer to axis $X_2$, than is the remainder of sidewall 412. In the illustrated embodiment, there are six slots 424 dividing sidewall 412 into six fingers 422, although the number of slots and fingers can be varied from the embodiment shown, as can the length of the slots 424.

Depending on the polymer compound used and the length of slots 424, each finger 422 may be reinforced by a respective gusset rib 430 (FIG. 4B). Each gusset rib 430 is radially oriented, is roughly triangular in shape and extends from the sidewall exterior surface 502 to the base front surface 414. In the illustrated embodiment, each gusset rib 430 connects to a point on sidewall surface 502 that is closer to free sidewall end 418 than it is to rear end 416. The gusset 430 therefore reinforces a majority of the finger 422 but not the entire length of it. In other embodiments the gusset ribs 430 may be deepened or omitted.

In the illustrated embodiment, a front margin 432 of each gusset 430 has a radially inward segment 434 and a radially outward segment 436. Margin segments 434 and 436 are linear in the illustrated embodiment and make an angle to each other. An angle of margin segment 434 with respect to axis $X_2$ is smaller than an angle of margin segment 436 with respect to axis $X_2$. Margin segment 436 may conform to a plane orthogonal to axis $X_2$. The angle of margin segment 434 may be chosen such that the socket sidewall 412 and the forward portions of gussets 430 will fit within left or right panel holes 212, 214.

More generally, in designing the fingers 422, there is a tradeoff between ease of installation and removal, on the one hand, and retention force, on the other. The stiffer the fingers 422, the more force will be necessary to install or remove the bed liner, but the affixation device will exhibit more resistance to forces tending to separate the bed liner from the pickup truck bed. Some installation force is desirable because then the user will hear an audible click when the socket 400 is attached to the pin 300.

An interior surface 426 of sidewall 412 (FIG. 4C), in combination with front surface 414 of base 402, define a socket interior 428. Socket interior 428 is sized to receive ball or free pin end 304.

Figure 5:
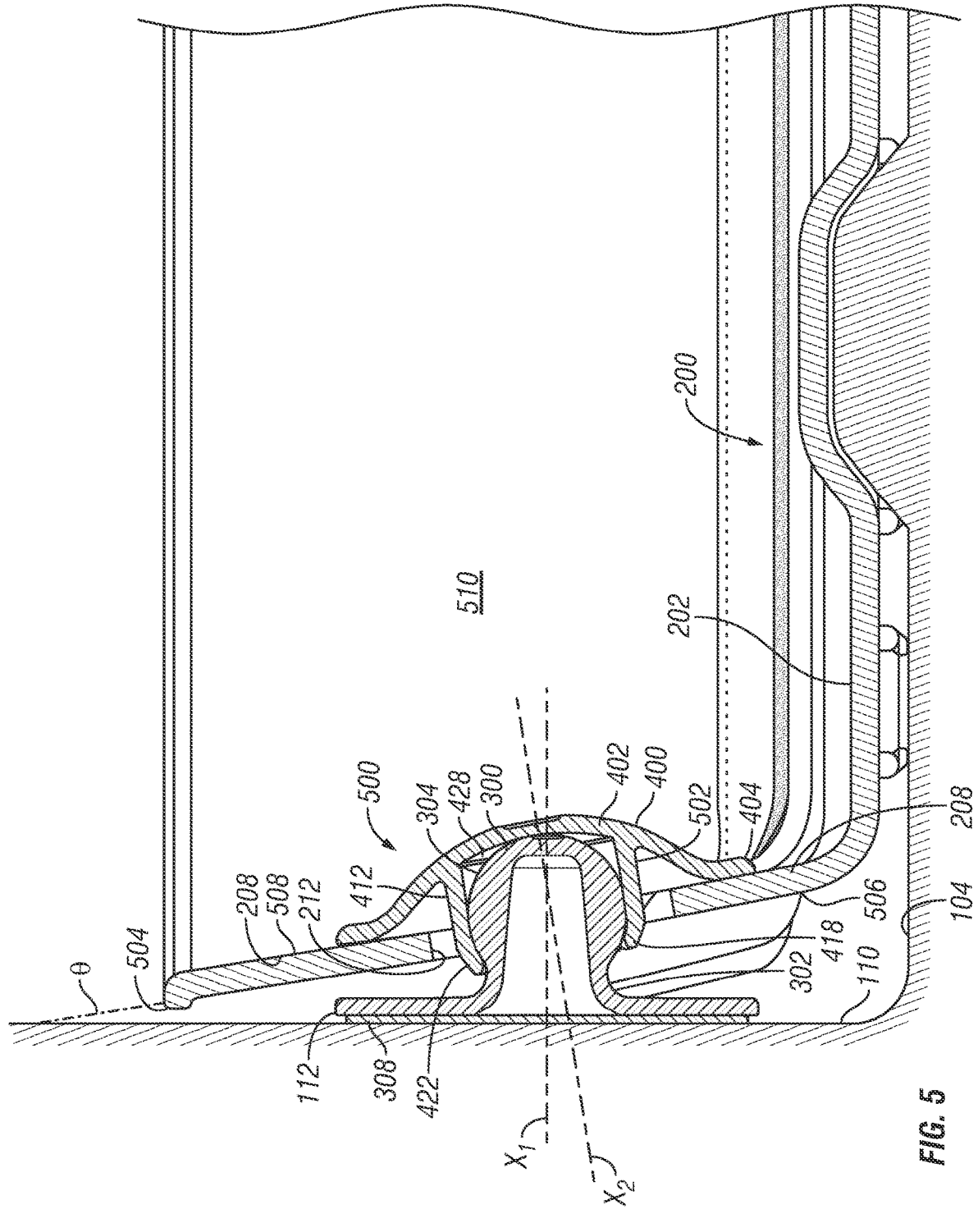
FIG. 5 is a longitudinal sectional view taken in a plane of the axes of the pin and socket, showing their fastening of an upstanding liner panel to a vehicle wall.

In FIG. 5, upstanding panel 208 has been fastened to vehicle wall 110 with the aid of a fastener 500 comprising attachment plate 112, pin 300 and socket or cap 400. Socket sidewall 412 has been inserted into panel hole 212. In the illustrated embodiment, the diameter of hole 212 (which can be about one inch) is larger than a largest diameter of the sidewall 412 and the frontmost portion of gussets 430. This looseness makes it easier for an end user to locate pin 300 with the socket 400. In other embodiments a radially exterior surface 502 of the sidewall 412, or gusset margin segments 434, could be more closely received in hole 212. Once socket sidewall 400 has been inserted into hole 212, the upstanding panel 208 can be advanced or swung such that a top edge or end 504 is moved into adjacency or even into interference with the vehicle wall 110. As this is being done, the ball or enlarged end 304 will begin to contact free end 418 of the socket sidewall 412. As the socket 400 is moved forward, the sidewall fingers 422 will begin to flex and cam around the ball 304, until the sidewall 412 has captured free end 304 inside of the socket interior 428. This will be accompanied by a "snap" that will be heard and/or felt. More generally, and with or without the segmentation of sidewall 412 into fingers 422, the front end 418 should elastically deform around free end 304 as the socket 400 is pressed onto the free end 304.

As installed, the upstanding panel 208 may be parallel to the vehicle wall 110, or, as illustrated, may have a considerable draft θ in respect of it. Draft θ, for example, can fall in the range of about 0 degrees to about 15 degrees, and preferably in the range of about 5 to about 10 degrees. In one embodiment, θ is about 7 degrees. In another embodiment θ is about 10 degrees. The draft is infinitely variable within these ranges. This difference in attitude of panel 208 and vehicle wall 110 also causes the same angle to occur between axes $X_1$ and axes $X_2$. Using the ball-and-socket fastener 500 permits this axial nonalignment. Where the free end 304 is rounded in a vertical plane, there will be a built-in tolerance for misalignment between hole 212 and pin 300 in the vertical plane. Where, as in the illustrated embodiment, the ball or pin end 304 is also rounded from side to side, there will be a tolerance of a certain degree of transverse misalignment between pin 300 and hole 212.

The upstanding panel has a forward surface 506 that is close to or adjacent to vehicle wall 110, and a rearward surface 508 that is more remote from vehicle wall 110 and faces a cargo area 510. Holes 212 and 214 extend from surface 506 to surface 508.

To install the liner 200 into the bed 100 for the first time, the end user removes flash or the like from panel holes 212, 214, inserts sockets 400 into upstanding panel holes 212, 214, and then snaps pins 300 to the sockets 400. The end user then positions the upstanding panel in a desired position relative to vehicle wall 100. This will show the end user where the attachment plates 112, 114 should be positioned on the vehicle wall 110. The positions are marked and the liner 200 and sockets 400 temporarily withdrawn. The end user then peels the front release layers (not shown) off of the front surfaces of the adhesive layers 308, and sticks the attachment plates 112, 114 on the vehicle wall 110. Pins 300 will then be in a condition ready to receive the sockets 400 when the liner panel 208 is again advanced to adjoin the vehicle wall 110. Thereafter it is a simple matter to snap off, or snap on, the sockets 400 from the pins 300, thereby removing or re-installing the liner 200 in bed 100.

While in the illustrated embodiment only two such fasteners have been used to hold down the liner 200, other fasteners could be used with other respective holes (not shown) in other upstanding panels, such as panels 206 and 210, to even more strongly join the liner 200 to the bed 100.

Figure 6A:
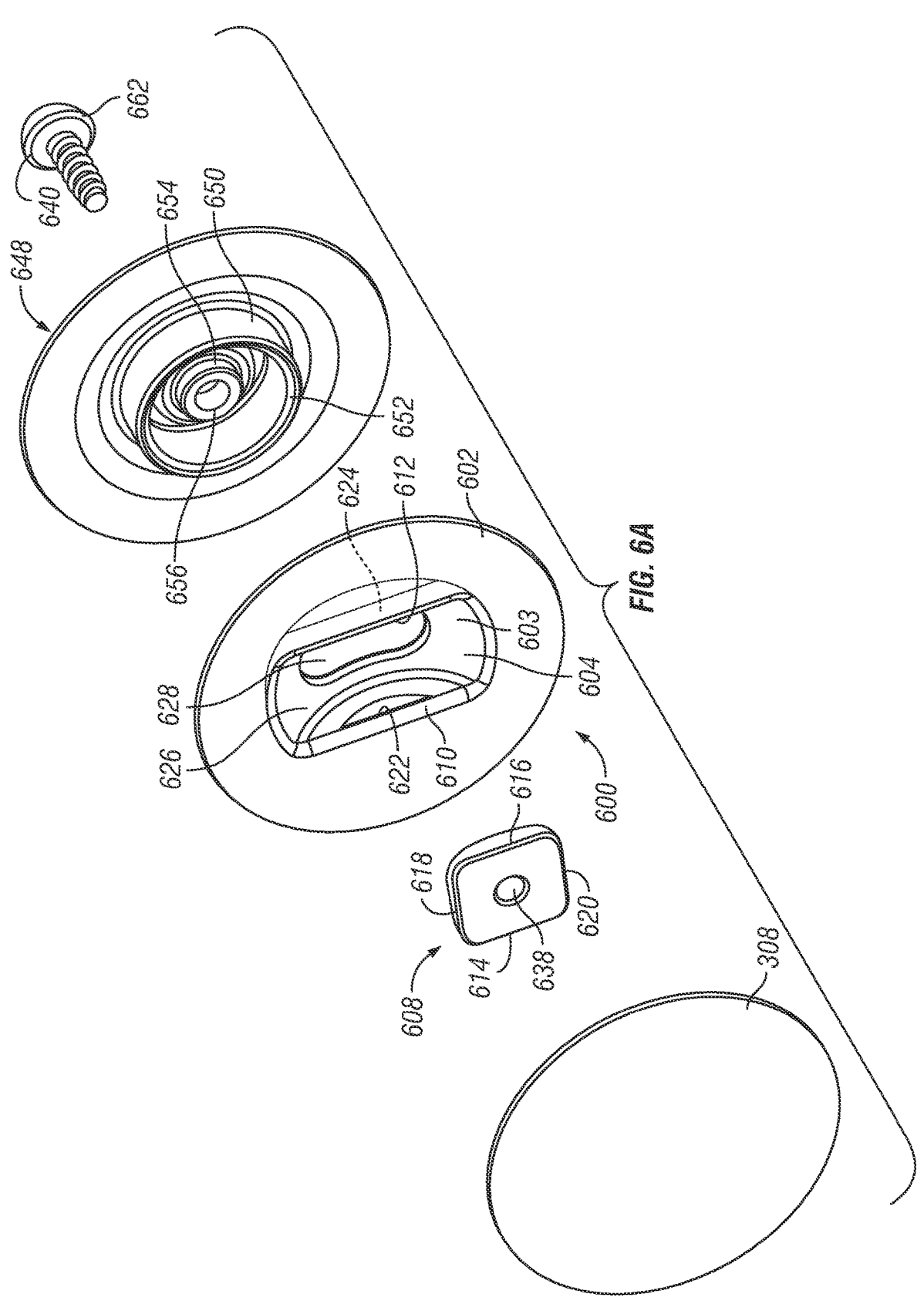
FIGS. 6A and 6B are front and back exploded views of a second embodiment of the invention.
Figure 6B:
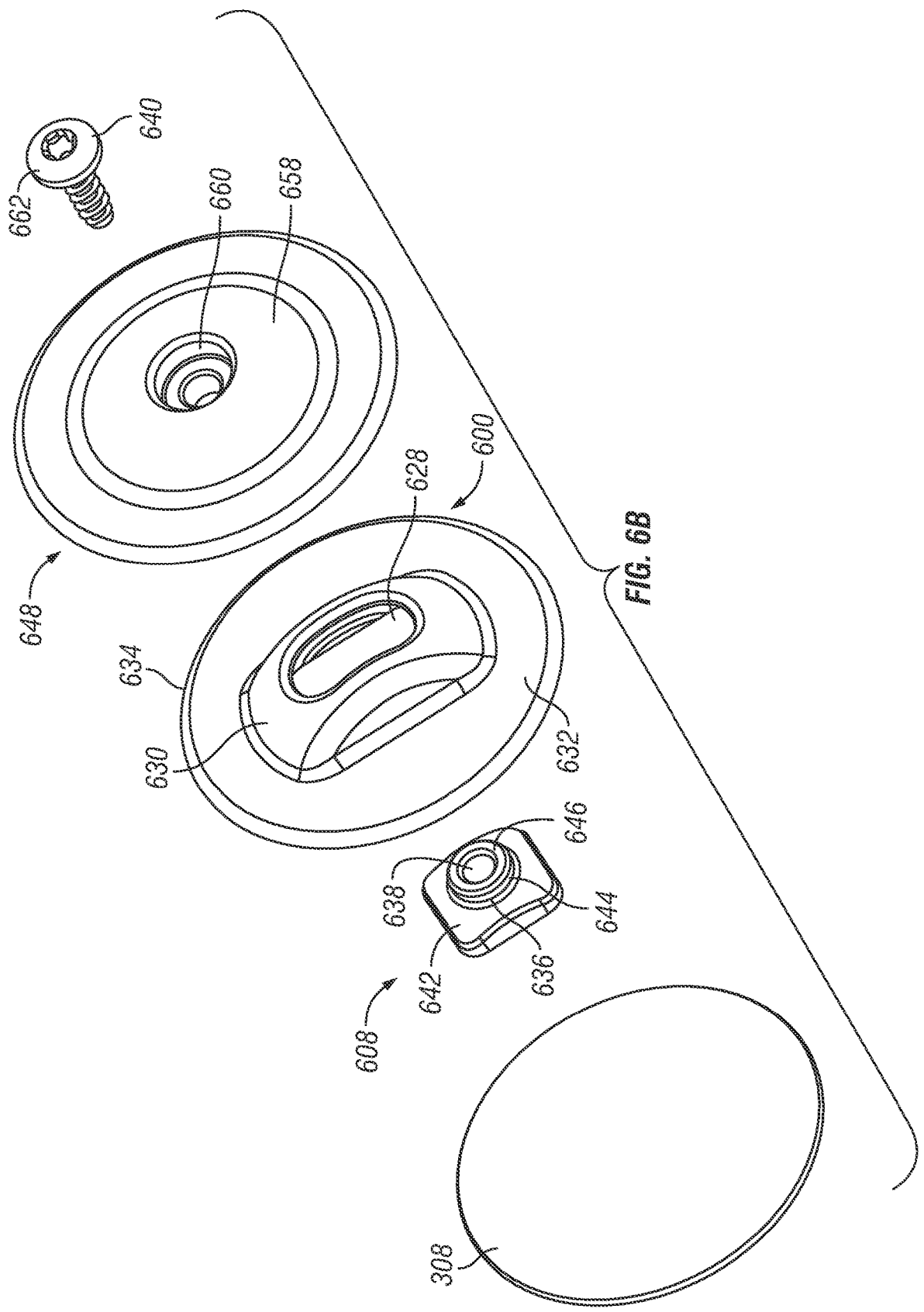
Figure 7:
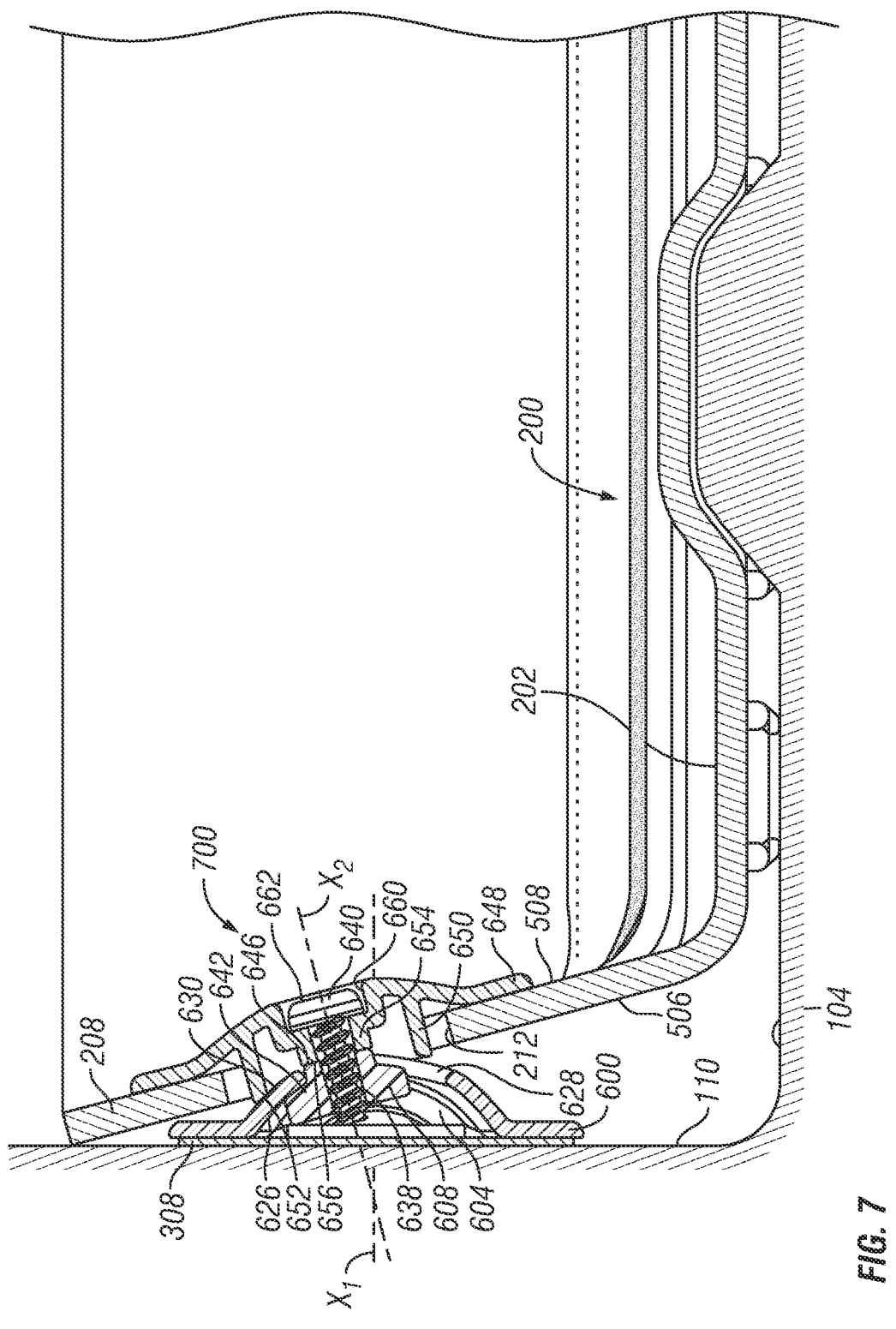
FIG. 7 is a schematic longitudinal sectional view similar to that shown in FIG. 5, but showing an upstanding liner panel being fastened to a vehicle wall using the second embodiment of the invention.

FIGS. 6A, 6B and 7 illustrate another embodiment of the invention in which a more permanent attachment of liner 200 to pickup truck bed 100 is desired. An attachment plate 600 can be circular and has a large, flat, annular front surface 602 to which adhesive layer 308 is attached. Adhesive layer 308 is used to attach plate 600 to the vehicle wall 110. Other means could attach plate 600 to vehicle wall instead, such as screws or the like. The plate front surface 602 surrounds a front opening 603 of a cavity or nut housing 604 that receives a nut 608. Opening 603 has opposed parallel sides 610, 612 that are separated by a predetermined width. Nut 608 may be square, with a width between opposing parallel sides 614, 616 and opposing parallel sides 618, 620 that is larger than the width between opening sides 610, 612, thus retaining nut 608 inside of nut housing 604. A side surface 622 bounding cavity 604 can be flat and is outwardly displaced from opening side 610. An opposed side surface 624 likewise can be flat and is outwardly displaced from opening side 612, such that a width between opposed, preferably parallel side surfaces 622, 624 is wider than the width between opening sides 610, 612, and is a little wider than the width between opposing nut sides 614, 616 or 618, 620. A front concave surface 626 of the nut housing 604 extends from side surface 622 to side surface 624, conforms to a spherical segment and has a rear opening or slot 628 which in use preferably is arranged vertically.

As seen in FIG. 6B, a convexly curved rear surface or boss 630 substantially follows front surface 626 in curvature and extent and may be a spherical segment. Slot 628 opens onto the rear surface 630. The rear curved surface 630 is surrounded by a planar rear surface 632 of attachment plate 600. A periphery 634 of surfaces 602, 632 (and of attachment plate 600) may be circular but its shape is not critical.

The nut 608 has a rear boss 636 with a cylindrical sidewall 644 and a rearmost surface 646. A threaded hole 638 extends through boss 636 and the rest of nut 608 and receives the shaft of a screw 640. The boss 636 rearwardly extends from a spherical convex rear surface 642 of the nut 608. In use, convex spherical surface 642 slides along concave spherical surface 626 of cavity 604, and boss sidewall 644 is received within slot 628.

As best seen in FIGS. 6A and 7, a cap 648 has a forward-extending endless sidewall 650 with a forward concave annular end surface 652 that is slidably engaged with the convexly curved rear surface 630 of attachment plate 600. Disposed radially inwardly of sidewall 650 is a forwardly extending boss 654 with a forward surface 656 that in use mates with rear surface 646 of nut 608. A rear surface 658 of cap 648 (FIGS. 6B and 7) may have a recess 660 that receives a head 662 of the screw 640, and may be slightly domed so as to have room to create the recess 660 at its axis.

This alternative affixation device 700 is shown assembled in FIG. 7. The attachment plate 600, as containing nut 608 inside of nut housing 604, is attached by adhesive layer 308 to vehicle wall 110 and is disposed on axis X₁. Axis X₁ will be horizontal or close to it. The sidewall 650 of cap 648 is inserted through panel hole 212 until annular end surface 652 rides on convex attachment plate surface 630. The nut 608 may travel in an arc between the upper and lower limits of curved slot 628 so that hole 638 of nut 608 lines up with screw 640, which then is threaded into hole 638. Cap 648, nut 608 and screw 640 will be on an axis X₂, which could be at any of a plurality of angles with axis X₁. In this illustrated embodiment, axis X₂ could be up to 15 degrees from axis X₁. As a result the panel 208 is firmly attached to vehicle wall 110 and a very large force will be needed to unintentionally separate the two. Assembly of panel 208 to vehicle wall 110, and disassembly therefrom, will require advancing or withdrawing screw 640 from nut 608, as with a screwdriver.

In summary, fasteners have been provided to securely fasten a liner into a vehicle cargo area, such that the liner will not be susceptible to delamination and separation caused by wind. The curved surfaces of the fasteners permit the upstanding panels of the liner to have a significant draft with the vehicle walls to which they adjoin or in which they are in contact. The end user may install one embodiment of these fasteners without tools.

While illustrated embodiments of the present invention have been described and illustrated in the appended drawings, the present invention is not limited thereto but only by the scope and spirit of the appended claims.

I claim:

1. A liner for a vehicle cargo area comprising:
a floor panel having a peripheral edge, the floor panel in use disposed on a floor of the vehicle cargo area;
an upstanding panel upwardly extending from the peripheral edge, and in use disposed adjacent a vehicle wall bounding the floor of the vehicle cargo area, at least one hole formed through the upstanding panel;
an attachment plate, means for attaching the attachment plate to the vehicle wall;
a pin extending outwardly from the attachment plate along a first axis, and in use, rearwardly from the vehicle wall, the pin having a shaft and a rounded free end, the free end of the pin being enlarged relative to the shaft and having a first diameter orthogonal to the first axis; and
a socket having a circumferential sidewall which extends forwardly toward the vehicle wall on a second axis, an exterior surface of the sidewall received in the at least one hole in the upstanding panel, the sidewall being formed of a resilient material, the sidewall bounding a socket interior and having a forward end, a second diameter orthogonal to the second axis across the forward end of the sidewall at rest being less than the first diameter, the second axis being disposed at an angle to the first axis.

2. The liner of claim 1, wherein the sidewall of the socket is divided into a plurality of fingers by a plurality of slots extending rearwardly from the forward end of the sidewall, the slots being angularly spaced apart from each other around the second axis.

3. The liner of claim 2, wherein the socket further comprises a base with a forward surface, a rearward end of the sidewall joined to the forward surface of the base, wherein for each finger, a respective radially oriented gusset rib extends from the exterior surface of the sidewall to the forward surface of the base.

4. The liner of claim 2, wherein the fingers are concavely curved relative to the second axis.

5. The liner of claim 1, wherein the means for attaching the attachment plate to the upstanding vehicle wall comprises an adhesive layer.

6. The liner of claim 1, wherein the free end of the pin is spherical in shape.

7. The liner of claim 1, wherein the at least one hole in the upstanding panel has a third diameter, the upstanding panel having a rear surface facing the cargo area, the socket comprising a base which abuts the rear surface of the upstanding panel, the base having an outer periphery with a fourth diameter larger than the third diameter, the sidewall of the socket having a rearward end opposed to the forward end, the rearward end of the sidewall joined to the base radially inwardly from the outer periphery of the base.

8. The liner of claim 7, wherein the base completely covers the at least one hole in the upstanding panel.

9. The liner of claim 7, wherein a center of the base is disposed rearwardly of the outer periphery of the base, thereby extending the socket interior rearwardly of the rear surface of the upstanding panel, thereby accommodating a portion of the enlarged head of the pin when the enlarged head of the pin is inserted beyond the forward end of the socket sidewall.

10. The liner of claim 1, wherein the vehicle cargo area is a pickup truck bed, the cargo area liner is a pickup truck bed liner, the upstanding panel is a forward panel of the pickup truck bed liner, and the vehicle wall is a rear wall of a pickup truck cab.

11. The liner of claim 1, wherein the at least one hole in the upstanding panel is a first hole, the attachment plate is a first attachment plate and the pin is a first pin, the liner further comprising:
a second attachment plate, means for attaching the second attachment plate to the vehicle wall at a location spaced from the first attachment plate;
a second hole formed through the upstanding panel to be spaced from the first hole;
a second pin extending rearwardly from the second attachment plate along a third axis, and in use, away from the vehicle wall, the second pin having a second shaft and a rounded second free end, the second free end of the second pin being enlarged relative to the second shaft and having a third diameter orthogonal to the third axis; and
a second socket having a forwardly extending circumferential second sidewall and disposed on a fourth axis, an exterior surface of the second sidewall received in the second hole, the second sidewall being formed of a resilient material, the second sidewall bounding a second socket interior and having a second forward end, a fourth diameter orthogonal to the fourth axis across the second forward end of the second sidewall at rest being less than the third diameter of the second free end of the second pin.

12. The liner of claim 1, wherein the vehicle wall is substantially vertical, the upstanding panel having a draft with respect to the vehicle wall in the range of about 0 degrees to about 15 degrees.

13. The liner of claim 1, wherein an angle between the first axis and the second axis is in the range of about 0 degrees to about 15 degrees.

14. The liner of claim 12, wherein the angle is selected from the range of about 5 degrees to about 10 degrees.

15. The liner of claim 1, wherein the attachment plate and pin are integrally molded of a polymer compound.

16. The liner of claim 1, wherein the socket is integrally molded from a polymer compound having a flexural modulus of about 2100 MPa as measured according to ISO 178.

17. The liner of claim 1, wherein the socket, pin and attachment plate are molded from a polymer compound including polybutylene terephthalate and polycarbonate.

18. A liner for a vehicle cargo area comprising:

a floor panel having a peripheral edge, the floor panel in use disposed on a floor of the vehicle cargo area;

an upstanding panel upwardly extending from the peripheral edge, and in use disposed adjacent a vehicle wall bounding the floor of the vehicle cargo area, a first surface of the upstanding panel facing the vehicle wall, a second surface of the upstanding panel opposed to the first surface and facing the vehicle cargo area, at least one hole formed through the upstanding panel from the first surface to the second surface;

an attachment plate, means for attaching the attachment plate to the vehicle wall;

a pin extending in a first direction along a first axis from the attachment plate and away from the vehicle wall, the pin having a shaft and a rounded free end, the free end of the pin being enlarged relative to the shaft and having a first diameter orthogonal to the first axis; and a socket formed on a second axis, a circumferential sidewall of the socket extending in a second direction along the second axis toward the vehicle wall, an exterior surface of the sidewall adapted to be received in the at least one hole in the upstanding panel, the sidewall being formed of a resilient material, the sidewall bounding a socket interior and having a first end, a second diameter orthogonal to the second axis across the first end of the sidewall at rest being less than the first diameter, a base of the socket disposed in a third direction opposite the second direction along the second axis from the first end of the sidewall and being disposed to be adjacent the second surface of the upstanding panel and remote from the first surface of the upstanding panel; wherein the free end of the pin may be inserted into the socket interior in the first direction beyond the first end of the sidewall to fasten the upstanding panel to the vehicle wall, the first axis capable of being at an angle to the second axis.

19. The liner of claim 18, wherein the means for affixing the attachment plate to the vehicle wall comprises an adhesive layer.

20. The liner of claim 18, wherein the vehicle cargo area is a pickup truck bed.

21. The liner of claim 18, wherein the free end of the pin is fastened to the socket in an interference fit.

22. A liner for a vehicle cargo area comprising:

a floor panel having a peripheral edge, the floor panel in use disposed on a floor of the vehicle cargo area;

an upstanding panel upwardly extending from the peripheral edge, and in use disposed adjacent a vehicle wall bounding the floor of the vehicle cargo area, at least one hole formed through the upstanding panel;

an attachment plate having a rear surface and an opposed front surface, means for attaching the front surface of the attachment plate to the vehicle wall;

a nut housing formed in the attachment plate, a convexly curved rear surface of the nut housing extending rearwardly from the rear surface of the attachment plate, a concavely curved front surface of the nut housing extending rearwardly from the front surface of the attachment plate, a slot formed in the nut housing to extend from the front surface of the nut housing to the rear surface of the nut housing, the slot having parallel opposed sides separated by a predetermined slot width;

a nut received into the nut housing and having a threaded bore, the nut having opposed parallel sides separated by a predetermined nut width larger than the predetermined slot width, the nut having a convexly curved rear surface adapted to slide along the front surface of the nut housing;

a cap with a rear surface and a front surface, a forwardly extending endless sidewall of the cap received in the at least one hole in the upstanding panel, a forward concave annular end surface of the sidewall slidably engaged with the convexly curved surface of the nut housing, a central bore of the cap disposed radially interiorly of the endless sidewall and extending from the cap front surface to the cap rear surface; and a screw received in the central bore of the cap, extending through the slot in the nut housing, and threadably engaged with the threaded bore of the nut, the screw, cap and nut being disposed on a first axis, the attachment plate being disposed on a second axis, whereby the first and second axes can be at any of a plurality of angles with respect to each other.

\* \* \* \* \*